Oct. 9, 1951
F. HAUSER
2,570,944
FILM CONTROLLED MOTOR SWITCH
Filed April 10, 1946
2 Sheets-Sheet 1
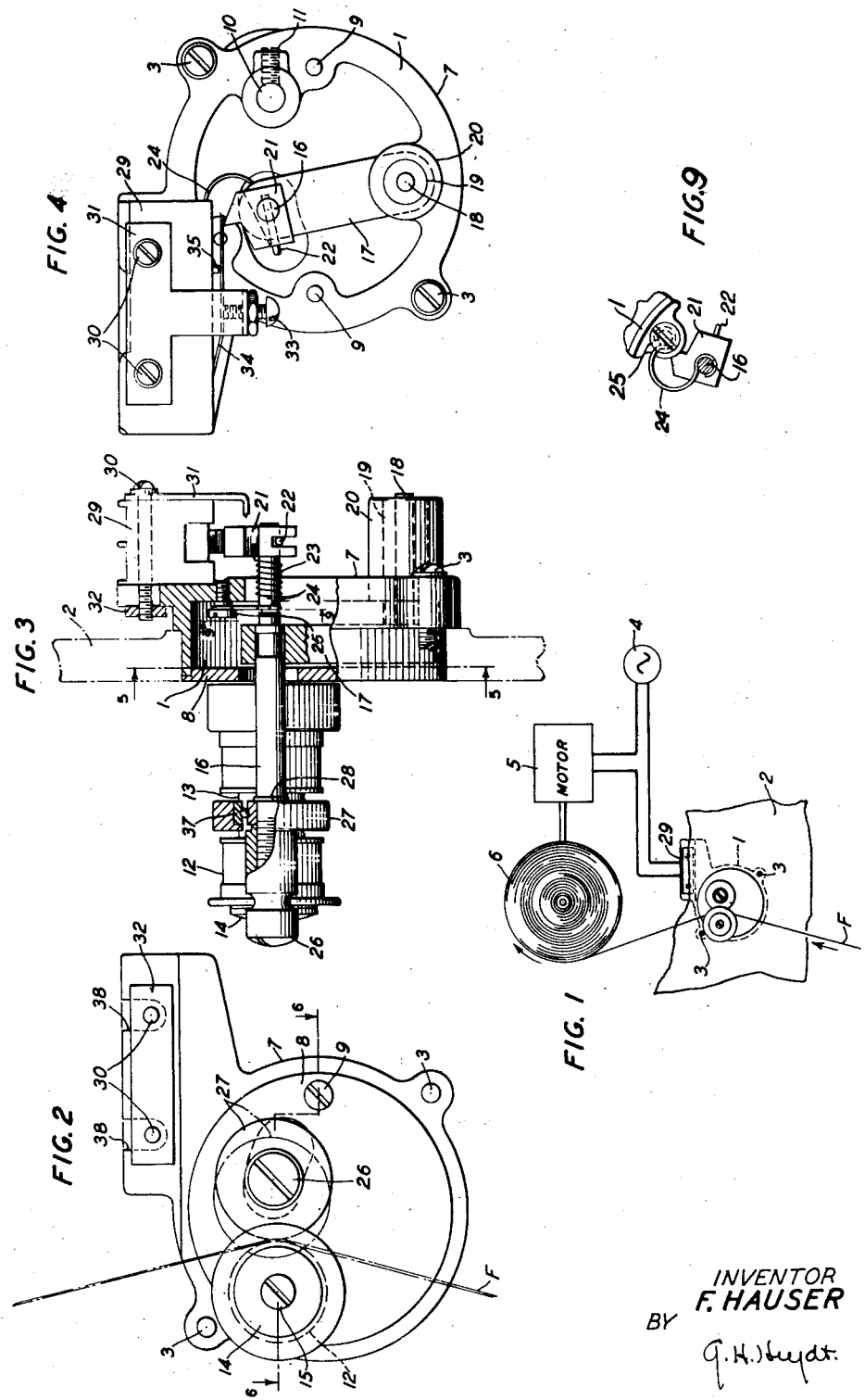
INVENTOR
F. HAUSER
BY
G. H. Huydt
ATTORNEY Oct. 9, 1951   F. HAUSER   2,570,944
FILM CONTROLLED MOTOR SWITCH
Filed April 10, 1946   2 Sheets-Sheet 2
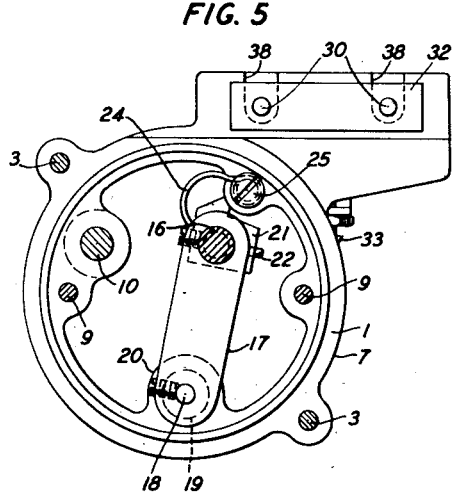
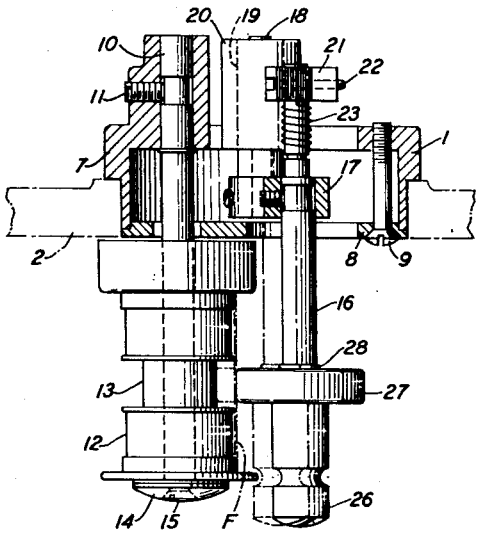
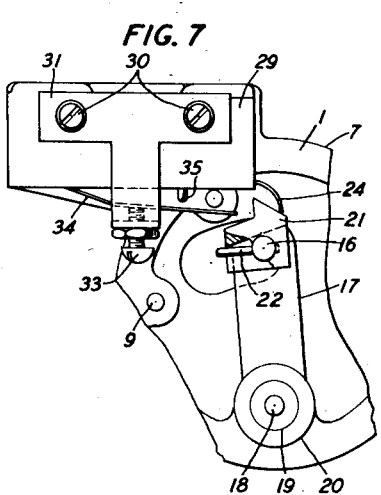
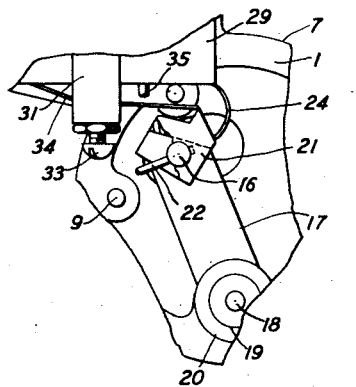
INVENTOR
F. HAUSER
BY
G. H. Hupt.
ATTORNEY Patented Oct. 9, 1951

2,570,944

UNITED STATES PATENT OFFICE 2,570,944

FILM CONTROLLED MOTOR SWITCH

Frederick Hauser, Los Angeles, Calif., assignor to Western Electric Company, Incorporated, New York, N. Y., a corporation of New York Application April 10, 1946, Serial No. 661,018

3 Claims. (Cl. 200—52)

This invention relates to the control of film-propelling mechanism in which a motor is employed to operate the film driving elements and in which the film itself controls the operation of switch elements in the motor circuit.

The object of this invention is to provide improved film-controlled motor switch-operating means.

A feature of the invention resides in the use of a single motor-control switch to close the motor circuit and break the motor circuit and includes switch-operating means controlled by the film.

An additional feature of the invention lies in the construction of film-controlled, switch-operating means comprising means to move the switch-operating means back to its normal position without closing the motor circuit.

In motion picture machines, electric motors are used to drive the film handling elements of film propulsion mechanisms to project pictures and to rewind film. These motors are usually provided with "on" and "off" switches to control their operation.

In many applications it is desirable to control the operation of the motor by exhaustion of the film in the apparatus and the prior art discloses numerous applications of film-controlled, switch-operating means for accomplishing this result. In these earlier applications it was found necessary to employ a separate main motor-control switch in addition to a film-controlled switch.

A difficulty encountered in the use of a main motor-control switch and a film-control switch is that in resetting the film-controlled, switch-operating means to its original position in order to properly thread the film, the film-controlled switch would close the motor circuit and start the motor unless the main motor-control switch has been opened. It follows, therefore, that it is necessary to open the main control switch when the film-control switch is being operated. Otherwise serious damage might occur by the operation of the motor, as mentioned above. Obviously, too, with the main motor-control switch open during the threading of the film, it is necessary to close the main switch before the film can be driven. Furthermore, as can readily be seen, the use of two switches means additional cost and maintenance expense. The use of a single switch (such as is proposed in this invention) accomplishes the functions of both switches.

These difficulties have been overcome in the present invention by means of a single motor-control switch in the motor circuit. The switching elements of the motor-control switch are operated by film-controlled means in cooperation therewith. In addition, means are provided in the switch-operating means whereby the switch-operating means may be reset without starting the motor.

In a preferred form of the invention, a single motor-control switch opens and closes the motor circuit of a motor-driven film propelling machine. The switch-operating elements of the motor switch cooperate with a blade mounted on the switch. The action of the blade depends on the movement of a horizontal arm pivoted for rocking motion. This arm bears a film-engaging roller and a pawl. An over-center spring cooperates with the arm to move the roller into engagement with the film while the pawl raises the blade of the motor switch to close the motor circuit. When the film runs out, the over-center action of the spring urges the arm to move the roller into a recess of a guide roller over which the film travels and disengages the pawl from the blade of the motor switch to open the motor circuit.

In resetting the motor switch for threading a film, the arm is moved to its normal position, that is, away from the guide roller. In so doing, the blade of the motor switch hits the pawl and causes the pawl to rotate on the arm. The pawl thus slides under the blade without causing it to rise sufficiently to close the motor circuit. The over-center action of the spring also urges the arm to its normal position when the center is passed. When the arm is being returned to its normal position undesired closure of the motor circuit is thus prevented by the use of the pawl.

The invention will be more clearly understood from the following detailed description read in connection with the accompanying drawings, in which:

Fig. 1 is a diagrammatic view of a film propelling mechanism showing the general arrangement of film driving and motor switch-controlling elements in accordance with the invention;

Fig. 2 is an enlarged front elevation of the motor switch-operating mechanism and associated motor switch;

Fig. 3 is a side elevation of the motor switch-operating unit with certain details in section;

Fig. 4 is a rear elevation of the motor switch-operating mechanism shown in Fig. 3;

Fig. 5 is a front elevation of the switch taken along lines 5—5 of Fig. 3;

Fig. 6 is a plan view of the switch-operating mechanism taken along lines 6—6 of Fig. 2;

Fig. 7 is a rear elevation of the switch-operating means in its position after the film has been exhausted; and Fig. 8 is a rear elevation of the switch-operating means showing its action upon being returned to its normal position to permit threading of a film, Fig. 9 is a front elevation of the switch taken along lines 9—9 of Fig. 3 showing the connections of the over-center spring.

Fig. 1 illustrates diagrammatically any type of film propelling mechanism in which switch 1 may be used. Switch-operating unit 1 is suitably mounted on plate 2 by screws 3, 3. A suitable source of power 4 is supplied to motor 5 and to the contacts of any suitable microswitch 29 mounted on switch-operating unit 1, as explained hereinafter. Microswitch 29 is adapted to operate motor 5. Motor 5 is mechanically connected to take-up reel 6. Film F is wound by reel 6 from a source of supply (not shown).

Referring to Figs. 3 and 6, housing 7 of switch-operating unit 1 is mounted on plate 2 by screws 3, 3. Cover 8 is fastened to housing 7 by means of screws 9, 9. Mounted in housing 7 and extending therethrough is roller shaft 10. Shaft 10 is positioned by set-screw 11. Guide roller 12 with a recessed cut-out portion 13 therein is mounted for rotation on shaft 10 by means of suitable bearings and retained thereon by retaining cap 14 held in place by screw 15.

Adjacent to roller shaft 10 is a horizontal arm 16 disposed in parallel relation to shaft 10. Arm 16 extends on both sides of a vertical supporting arm 17. A stud 18 extends from the lower end of vertical arm 17. Stud 18 is journaled for rotation in bushing 19. Bushing 19 is mounted in a supporting lug 20 formed in housing 7. Arm 16 carried by vertical arm 17 may thus be pivoted on stud 18.

Pawl 21 is mounted for limited pivotal motion on one end of arm 16. Pawl 21 is bifurcated and positioned on arm 16 by a pin 22 projecting from arm 16 between the two branches of the pawl. Thus, the pawl is prevented from moving laterally on the arm. One end of a spring 23 is connected to pawl 21 and the other end fastened to arm 16. Spring 23 is so wound on arm 16 to urge an internal shoulder of pawl 21 to rest on projecting pin 22 which also serves as a stop. The tooth of pawl 21 is indented as shown in Fig. 4.

Between pawl 21 and pivoted supporting arm 17 an over-center spring 24 is suitably connected at one end to an annular groove in arm 16 and connected to screw 25 threaded in housing 7, as shown in Fig. 9. Spring 24 urges arm 16 to rotate about stud 18 in either direction away from a central position. Arm 16 may be moved in either direction by knob 26. Roller 27 is mounted on ball-bearings 37 for rotation on arm 16. The bearing 37 is held in position to bring roller 27 into operative relation with respect to cut-out 13 of guide roller 12 by means of internally threaded knob 26 which forces bearing 37 against a shoulder 28, integral with arm 16.

Microswitch 29 together with its operating spring blade 34 is mounted on an integral extension of housing 7 by means of screws 30, 30. Screws 30, 30 also support a bracket 31 on the remote face of microswitch 29. Microswitch 29 is fastened to housing 7 by screws 30, 30 slipped into slots 38, 38, the screws being threaded into tapped holes of a rectangular block 32.

A bent-under portion of bracket 31 supports an adjusting screw 33, as shown in Fig. 4. Adjusting screw 33 adjusts the distance between spring blade 34 and plunger 35 cooperating therewith. Spring blade 34 is raised or lowered by the movement of pawl 21. The movement of spring blade 34 operates plunger 35 which makes or breaks a pair of contacts in a well-known manner in microswitch 29 to open or close the motor circuit. Spring blade 34 is operated by the movement of pawl 21 in one direction and is not operated when the pawl is being returned to its normal position, as will be explained hereinafter.

In the operation of a film-propelling mechanism employing a film-controlled motor switch, as described above, arm 16 is normally in a position away from guide roller 12. Over-center spring 24 urges arm 16 to remain in this position.

In its normal position arm 16 is held away from guide roller 12 and pawl 21 is not in engagement with blade 34 of microswitch 29. Thus motor 5 is at rest and the film-propelling mechanism is in suitable condition for threading film. Film F is threaded over guide roller 12 and suitably connected to reel 6.

Arm 16 is then moved towards guide roller 12 and roller 27 is brought into engagement with film F. In this position, pawl 21 engages blade 34 and raises it. Blade 34 thus moves plunger 35 to close the contacts of the motor circuit causing motor 5 to start. Reel 6, which is mechanically interlocked with motor 5, starts to rotate and wind film F onto the reel.

When film F runs out, over-center spring 24 urges arm 16 to move roller 27 into the cut-out portion 13 of roller 12 and pawl 21 is disengaged from blade 34. Blade 34 drops down and releases plunger 35, as shown in Fig. 7. Plunger 35 opens the contacts of the motor circuit and motor 5 stops causing reel 6 to stop.

In order to rethread a film, arm 16 is moved back to its normal position. As arm 16 is being returned to its normal position, the indent of pawl 21 hits blade 34. This causes pawl 21 to rotate around arm 16 until it is able to clear the blade as shown in Fig. 8. Pawl 21 in its return movement is thus moved to a non-operating position by blade 34. As arm 16 is moved further, pawl 21 snaps back to its stop position against rod 22 due to the action of spring 23, without causing blade 34 to rise sufficiently to operate plunger 35. In this manner, closure of the motor circuit on the return movement of arm 16 is prevented by the use of pawl 21. Arm 16 is held in its normal position away from guide roller 12 to permit rethreading of a film; and pawl 21 is spring-urged by spring 23 against rod 22. Rod 22 prevents pawl 21 from rotating when it is moved into engagement with blade 34 as arm 16 is moved in the other direction to operate the film propelling mechanism.

What is claimed is:

1. In film-propelling mechanism having a motor for driving the film, a switch disposed in the circuit of said motor, an arm bearing a roller, an over-center spring connected to said arm, said spring being capable of urging said arm in either direction away from the center position, a pawl mounted for motion with said arm, said arm in its normal position maintaining said roller away from the film and said pawl out of engagement with said switch thus permitting threading of the film, said arm in a second position bringing said roller into engagement with the film and maintaining said engagement by the action of said over-center spring on said arm at which time said pawl is brought into engagement with said switch to close said switch to start the motor, said arm being urged forward into a third position upon exhaustion or removal of the film by the action of the over-center spring on said arm thus disengaging said pawl from said switch and opening said switch to stop the motor whereas during return of said arm to its normal position to permit threading of the film said pawl is moved to a non-operating position to maintain said switch open to prevent starting of the motor, said pawl being movable to return it to its original operative position at the time said arm reaches its normal position.

2. In film-propelling mechanism having a motor for driving the film, a switch disposed in the circuit of the motor, an arm, a recessed roller over which the film travels, a second roller mounted for motion with said arm into engagement with the film so that the second roller is adjacent to the recessed portion of said first roller, a bifurcated pawl spring-connected to said arm and rotatably secured thereon, a projection extending from said arm and extending between the branches of said pawl to serve as a stop for said pawl, said pawl actuating said switch to start the motor when said arm is moved from its normal position to bring said second roller into engagement with the film and to open the switch to stop the motor upon further movement of said second roller upon removal or exhaustion of the film, said pawl being movable to a non-operating position by said switch to prevent said motor from starting when said arm is being returned to its normal position, said pawl being rotatable back to its original position by the action of said spring.

3. In film-propelling mechanism having a motor for driving the film, a switch disposed in the circuit of the motor, a recessed roller over which the film travels, an arm, a spring connected to said arm to urge it in either direction away from a central position, a second roller mounted for motion with said arm into engagement with the film by the action of said over-center spring on the arm so that the second roller is adjacent to the recessed portion of said first roller, a pawl mounted for motion with said arm for actuating the switch to start the motor when said second roller is spring-urged into engagement with the film and for opening said switch to stop the motor upon further movement of said arm by the action of said over-center spring upon removal or exhaustion of the film, said pawl being movable to a non-operating position by the switch to prevent the motor from starting when said arm is being returned to its normal position, and means for resetting the pawl to its original position.

FREDERICK HAUSER.

REFERENCES CITED

The following references are of record in the file of this patent:

UNITED STATES PATENTS

| Number | Name | Date |
|---|---|---|
| 1,968,250 | Frederick | July 31, 1934 |
| 2,162,709 | Gill | June 20, 1939 |